United States Patent [19]

Willison et al.

[11] 4,363,888

[45] Dec. 14, 1982

[54] BEAD POLYMERIZATION PROCESS

[75] Inventors: Geoffrey Willison, Cleveland; John C. W. Hodge, Northallerton, both of England

[73] Assignee: Tioxide Group Limited, Cleveland, England

[21] Appl. No.: 257,130

[22] Filed: Apr. 24, 1981

[30] Foreign Application Priority Data

May 9, 1980 [GB] United Kingdom ............... 8015374

[51] Int. Cl.$^3$ ............................................. C08J 3/26
[52] U.S. Cl. ................................................. 523/502
[58] Field of Search ........................................ 523/502

[56] References Cited

U.S. PATENT DOCUMENTS

| | | | |
|---|---|---|---|
| 4,089,819 | 5/1978 | Coates et al. | 260/2.5 N |
| 4,321,332 | 3/1982 | Beresford | 523/502 |

FOREIGN PATENT DOCUMENTS

| | | |
|---|---|---|
| 1312083 | 4/1973 | United Kingdom . |
| 1332469 | 10/1973 | United Kingdom . |
| 1392577 | 4/1975 | United Kingdom . |
| 1476510 | 6/1977 | United Kingdom . |
| 1548294 | 7/1979 | United Kingdom . |

Primary Examiner—Allan Lieberman
Assistant Examiner—P. Short
Attorney, Agent, or Firm—Schuyler, Banner, Birch, McKie & Beckett

[57] ABSTRACT

A process for the preparation of rigid beads, of cross-linked polyester resin which beads may be solid or vesiculated, by forming an oil-in-water or a water-in-oil-in-water emulsion in which the oil phase contains an unsaturated polyester resin and an unsaturated organic monomer to provide said cross-linking and thereafter heating the emulsion to a temperature of at least 45° C. before initiating polymerization of the oil phase by the introduction into the system of a polymerization initiator, and promoter system, if the latter is not already present in the emulsion.

10 Claims, No Drawings

BEAD POLYMERIZATION PROCESS

The present invention relates to an improved process for the production of rigid beads formed from cross-linked polyester resin.

The beads may be vesiculated or unvesiculated.

The production of such beads has been described, for example, in U.K. Pat. Nos. 1 332 469 and 1 312 083. The beads may or may not contain pigment, for example pigmentary titanium dioxide.

It has been found that when processes such as those described in the prior art i.e. wherein an oil phase comprising an unsaturated polyester resin and an unsaturated organic monomer (to provide cross-linking between the polyester chains on curing) is formed into an emulsion with an aqueous phase (which emulsion may be an oil-in-water emulsion—to provide unvesiculated beads—or a water-in-oil-in-water emulsion to provide vesiculated beads) in the presence of an initiator/promoter system prior to curing the oil phase by heating, the organic monomer may be incompletely copolymerised and, as a result, the aqueous dispersion of cured beads has an objectionable odour of unreacted monomer, for example of styrene.

Furthermore, the presence of free monomer obviously indicates that some monomer has not ben utilised in cross-linking the polyester resin, thereby giving rise to a reduced quantity of beads than would otherwise be formed of a given size and/or beads of unsatisfactory quality. In addition, there is waste of expensive monomer.

It is an object of this invention to provide a process whereby the above disadvantages may be reduced or eliminated.

In most of the published prior art processes the initiator, e.g. cumene hydroperoxide, and part of the promoter system such as an organic amine are present during the formation of the emulsion and are introduced either in the aqueous phase or in the oil phase, prior to emulsion formation. In such processes, and where iron or ordinary steel equipment is used in which to form the emulsion, ferrous ions derived from the iron/steel surfaces of the equipment which complete the the promoter system may cause premature curing of the oil phase and this is disadvantageous both to the quality of the beads produced and to the level of free styrene in the bead slurry when curing is complete.

U.K. Pat. No. 1 548 294 refers briefly to a process for the production of vesiculated beads of cross-linked polyester resin in which a water-in-oil-in-water emulsion is formed and in which the dispersed oil phase particles are reduced to the final size prior to the addition of a polymerisation initiator to initiate and complete the polymerisation of the dispersed oil phase to produce beads of the desired size. There is no indication in this specification of the temperature at which the initiator is to be added but from some of the Examples it appears that the patentee added the initiator to the water-in-oil-in-water emulsion at about 20° C.

It has also been found that when the amount of the amine component of the promoter system is increased in an effort to enhance the utilisation of the monomer, the condition, for example the viscosity, of the emulsion may be adversely affected. For example, organic amines such as diethylene triamine and monoisopropanolamine may cause excessive thickening and/or general instability of the emulsion when present in excessive amounts.

The presence of high levels of organic amines may also cause discolouration of the beads produced and make such beads unacceptable for at least some of the uses for which they are intended.

It will be appreciated that the amines, in addition to forming part of the promoter system for curing, are also incorporated in the emulsion to stabilise the emulsion as mentioned later in this specification, and thus at least part of these compounds are commonly present in the system before curing commences but, curing does not commence before the addition of the initiator, for example cumene hydroperoxide.

In the present invention the initiator is added only when the oil phase globules in the emulsions are of the correct particle size and are at the selected temperature for curing.

Accordingly, the present invention is a process for the preparation of rigid beads formed from cross-linked polyester resin comprising forming an oil-in-water or a water-in-oil-in-water emulsion in which the oil phase contains an unsaturated polyester resin and an unsaturated organic monomer to provide said cross-linking; heating the emulsion to a temperature of at least 45° C. and thereafter introducing into the heated emulsion a polymerisation initiator, and promoter system if not already present, thereby initiating cross-linking of the resin to form rigid beads of cross-linked polyester resin.

It has been found that the degree of utilisation of the unsaturated monomer is enhanced if the emulsion is heated before the initiator (and promoter system if not already present) is introduced into the system when compared with prior art systems wherein the initiator (and promoter system) is present in the emulsion prior to heating to cure, i.e. to cross-link, the polyester resin. It has also been found that generally no increased quantity of initiator or promoter (and particularly of the organic amine component thereof) is required when compared with prior art processes in order to achieve the benefits of this invention thus avoiding the problem of instability of the emulsion and/or the discolouration of the beads produced.

It is preferred that the total weight of amine present in the emulsion should be below 1.1% of the total weight of unsaturated resin, e.g. polyester resin, and monomer since by the use of such quantities of amine discolouration of the beads and/or instability of the emulsion is reduced or avoided.

The unsaturated polyester resin used in the present invention may be any such resin which is capable of reaction with an unsaturated organic monomer at temperatures below about 100° C. to form a rigid cross-linked polymer having suitable physical and chemical properties for bead formation. Many such resins (and a test for their suitability in the formation of beads) are described, for example, in U.K. Pat. No. 1 332 469. It is preferred, in the process of the present invention, to use resins formed by the condensation of a dihydric alcohol (or its corresponding oxide) with a proportion of an aliphatic dicarboxylic acid and with a proportion of an aromatic dicarboxylic acid (or the corresponding ahydride).

Unsaturated polyester resins formed from the condensation of ethylene, propylene, tetra-, penta- or hexamethylene glycols, or their corresponding oxides, with unsaturated dibasic acids such as fumaric or maleic (or the anhydride in the latter case) and with a proportion of an unsaturated aromatic acid such as isophthalic or phthalic acid (or phthalic anhydride) have been found to be particularly suitable for the present process. The condensation product of propylene oxide; fumaric acid or maleic anhydride and phthalic acid (or the anhydride) is particularly suitable.

It is generally desirable that the proportions of components and the degree of condensation be such that the resulting unsaturated polyester resin has an acid value in the range 5 to 100 (expressed as mgms KOH per gram of resin) and particularly one in the range 10 to 35.

It has also been found advantageous to utilise unsaturated polyester resins having a viscosity in the range 5 to 60 and particularly a viscosity in the range 20 to 40 poise, (when measured as a 70% by weight solution in the unsaturated monomer, e.g. styrene, at 25° C.).

It may also be of advantage to modify the unsaturated polyester resin by the incorporation into the resin of polyethylene oxide chains since such resins may more readily form stable emulsions of the type required by the present invention. Such polyethylene oxide-modified resins are described, for example, in U.K. Pat. Nos. 1 392 577 and 1 548 294.

In the process of this invention the polyester resin is initially dissolved in the unsaturated monomer, the latter being present in sufficient quantity to provide the necessary cross-linking of the resin component. The amount of monomer present is normally at least 30% by weight on the resin and is preferably present in an amount in the range 40% to 70%.

The preferred monomer is styrene but other unsaturated organic monomers capable of cross-linking the unsaturated polyester resin may be used, for example those described in U.K. No. 1 332 469 may be used, if desired.

The emulsion may be formed by a single-stage process wherein an oil phase is dispersed in an aqueous phase prior to curing. Such a system is most suitable for the production of unvesiculated beads or beads having a small amount of vesiculation. Alternatively, a water-in-oil emulsion may be dispersed into a second aqueous phase to form a water-in-oil-in-water emulsion to provide vesiculated beads.

In either case the intention is the same, that is to provide a stable emulsion of globules of the oil phase of the desired size (which, in the case of the water-in-oil-in-water emulsion contain water filled vesicles). The oil phase globules are then cured by heating the emulsion to a temperature of at least 45° C. prior to the addition of the initiator (and promoter system, if not already present) to cause cross-linking of the resin and the formation of rigid beads.

In addition to the presence of the oil phase and the aqueous phase there is normally present a base, for example as described in U.K. Pat. No. 1 332 469, having a dissociation constant (i.e. pKa value) of less than 8. The preferred bases are ammonium hydroxide or a polyamine such as diethylene triamine (which, as noted previously, may also form part of the promoter system, for example with ferrous ions).

There are also usually present in the emulsion other additives such as thickeners and surface active agents. One suitable thickener is hydroxyethyl cellulose and a suitable surface active agent is partially hydrolysed polyvinyl acetate. Other thickeners and surface active agents are referred to in the prior art.

Suitable concentrations of thickener are in the range 0.05% to 0.5% by weight (on total weight of bead slurry) and of surface active agent 0.1% to 2.5% by weight, again on total weight of bead slurry.

The presence of base, thickener and surface active agent assist in the formation of a stable emulsion in which the oil phase globules are of the desired particle size.

In addition to the other additives it may also be desirable to incorporate a pigment such as titanium dioxide into the beads. The pigment may remain in the vesicles (in the case of vesiculated beads) but is preferably associated with the cross-linked resin forming the internal structure of the beads. The pigment may initially be dispersed either in the aqueous phase or in the oil phase prior to forming the emulsion and this is normally accomplished by milling the pigment into the appropriate liquid prior to forming the emulsion. Pigment is preferably added in an amount to give a concentration in the range 25% to 50% by weight of the total weight of pigment plus resin and monomer.

The process of the present invention is generally carried out by forming the emulsion, either as an oil-in-water or a water-in-oil-in-water emulsion, as desired, and when the globules of the oil phase of the correct size have been achieved, hot water is added while continuing stirring. The temperature and quantity of water added should be such as to give a final mixture having a temperature of at least 45° C. and preferably of at least 50° C.

The initiator (and associated promoter system, when required) is then added and stirring continued, if desired, until curing i.e. cross-linking polymerisation, has taken place. The chemical reaction of curing normally provides heat. Generally, the temperature of the mixture rises and is maintained in the present process above 50° C. and preferably above 55° C. for a period of at least two hours.

Suitable initiators (and promoters where required) are described in U.K. Pat. No. 1 332 469. It is preferred to use cumene hydroperoxide as the initiator and diethylene triamine and/or monoisopropanolamine and ferrous iron as the promoter system in the present invention.

When curing of the beads is complete it is desirable that the resulting mixture contains not more than 0.3% of free organic monomer, for example styrene, and preferably not more than 0.2% by weight.

The cured beads may be retained as an aqueous suspension, for example for use in the opacifying of latex paint or of paper, or they may be recovered, washed and dried for use in non-aqueous media.

Of the following Examples, Examples 1 and 5 illustrate the present invention. Example 6 also shows the present invention but also shows the disadvantage of using a higher quantity of total amine. Examples 2, 3 and 4 are not according to the present invention.

EXAMPLE 1

An unsaturated polyester resin was prepared by condensing together fumaric acid, phthalic anhydride and propylene glycol in the molar ratio 3:1:4.5. The product had an acid value of 24 mgm potassium hydroxide per gram of resin and a viscosity of 25 poise (as a 70% by weight solution in styrene at 25° C.).

An oil phase was prepared comprising a 50% solution of the resin in styrene and a water-in-oil emulsion was formed by adding, with high speed stirring, a pre-milled aqueous phase comprising 114 parts of distilled water; 20.5 parts of a 5% aqueous solution of CALGON PT; 267 parts of a rutile $TiO_2$ pigment and 2.5 parts of diethylene triamine to 309 parts of the oil phase.

Part (177 parts) of this water-in-oil-emulsion was added with high speed stirring to a second aqueous phase comprising 0.54 parts of hydroxyethyl cellulose; 2.55 parts of 90% hydrolysed polyvinyl acetate and 171 parts of water to form a water-in-oil-in-water emulsion having oil phase globules of an average diameter of 12 micron.

To this emulsion was then added with stirring 131 parts of water at 90° C. to give a final emulsion having a temperature of 46° C.

Curing was then commenced by the addition, with stirring, of 1.25 parts of cumene hydroperoxide; 10 parts of a 2% aqueous solution of diethylene triamine and 2 parts of a 0.9% aqueous solution of ferrous sulphate.

After 2 hours the temperature of the mixture was 60° C. The vesiculated bead slurry was left overnight and the free styrene content, after curing was complete, was 0.2% on the total weight of slurry.

('Parts' are parts by weight. 'CALGON' is a Registered Trade Mark).

EXAMPLE 2

Example 1 was repeated except that the water added had a temperature of 60° C. rather than 90° C. and after mixing the temperature was 40° C. rather than 46° C. The temperature of the bead slurry after two hours was 51° C. The free styrene content was found to be 0.4%.

EXAMPLE 3

Example 1 was repeated except that water at 10° C. was added rather than at 90° C. and the temperature of the emulsion was found to be 18° C. and after two hours the temperature of the bead slurry was 23° C. The free styrene content of the bead slurry after standing overnight was 2.9%

EXAMPLE 4

An unsaturated polyester resin was prepared by the condensation polymerisation of maleic anhydride, phthalic anhydride and propylene glycol in the molar proportions of 3:1:4.5 respectively. The product had an acid value of 23.2 mg potassium hydroxide per gram and a viscosity of 25 poise (as a 70% by weight solution in styrene at 25° C.).

An oil phase was then prepared comprising a 50% by weight solution of the above resin in styrene.

A water-in-oil emulsion was formed by high speed stirring from (a) a pre-milled aqueous phase comprising 114 parts of water; 20.5 parts of a 5% aqueous solution of CALGON PT; 267 parts of rutile titanium dioxide pigment and 2.5 parts of diethylene triamine and (b) 309 parts of the oil phase referred to in the previous paragraph.

This water-in-oil emulsion (177 parts) was added with high speed stirring to a second aqueous phase which consisted of 0.54 parts of hydroxy ethyl cellulose; 2.55 parts of a 90% hydrolysed polyvinylacetate and 171 parts of water to form a water-in-oil-in-water emulsion. Stirring was continued until the particle size of the dispersed phase had an average diameter of 12 microns.

The water-in-oil-in-water emulsion was then diluted by the addition of 131 parts of water at a temperature of 55° C. to give a final emulsion at a temperature of 33° C.

Polymerisation was initiated by the addition of 1.25 parts of cumene hydroperoxide; 10 parts of a 2% aqueous solution of diethylene triamine and 2 parts of a 0.9% aqueous solution of ferrous sulphate.

the total amine content of the mixture was 1.07% by weight based on the content of resin and styrene.

After 30 minutes the temperature of the emulsion was 40° C. The resulting vesiculated resin bead slurry was left overnight and the free styrene content was measured and found to be 0.7% on the total weight of slurry.

The brightness and colour of the beads is shown in Table 1.

EXAMPLE 5

Example 4 was repeated with the exception that the diluted water-in-oil-in-water emulsion was heated to 55° C. before polymerisation was initiated by the addition of the cumene hydroperoxide, diethylene triamine and ferrous sulphate.

The bead slurry after standing overnight, had a free styrene content of only 0.3% on the total weight of slurry.

The brightness and colour of the beads is shown in Table 1.

EXAMPLE 6

The resin prepared as described in Example 4 was dissolved in styrene to give a 40% solution of the resin as the oil phase.

A water-in-oil emulsion was formed by adding with high speed stirring to 309 parts of the oil phase an aqueous phase comprising 128.6 parts of water; 9.2 parts of 75% active solution of AEROSOL OT; 1.2 parts of ethanol; 0.4 parts of BEVALOID 60; 243 parts of a rutile titanium dioxide pigment; 2.23 parts of diethylene triamine and 0.69 parts of isopropanolamine, the components of the aqueous phase being premilled prior to mixing with the oil phase.

This water-in-oil emulsion (173 parts) was added with high speed stirring to a second aqueous phase comprising 0.37 parts hydroxy ethyl cellulose; 2.7 parts of a 90% hydrolysed polyvinylacetate and 175 parts of water.

The resulting water-in-oil-in-water emulsion was stirred until the dispersed phase particles had an average size of 12 microns and the product was diluted by adding 176 parts of hot water sufficient to give a final temperature to the mixture of 55° C. Polymerisation was then initiated as described in Example 4.

The total amine content of the mixture was 1.20% by weight on weight of resin and monomer.

The free styrene content of the resulting bead slurry after standing overnight was 0.1% by weight on the total weight of the slurry but the colour of the beads produced was inferior, as shown in Table 1, to those produced in Examples 4 and 5 in which a reduced amount of amine was present in the final water-in-oil-in-water emulsion.

The words BEVALOID and AEROSOL are Registered Trade Marks.

TABLE 1

| Product from:- | L | a | b |
|---|---|---|---|
| Example 4 | 95.2 | −0.3 | 2.3 |
| Example 5 | 95.3 | −0.4 | 2.2 |
| Example 6 | 95.1 | −0.2 | 2.7 |

L, a and b represent the colour co-ordinates of a paint made from the beads in the manner described below.

A pre-mix of 7.5 parts of a rutile titanium dioxide; 2.5 parts of water; 13.4 parts of a 3% solution of hydroxy ethyl cellulose in water and 76 parts of a 55% solids vinyl co-polymer emulsion was prepared.

This premix (50 parts) was added to 60 parts of each bead slurry to be tested and the paints thus formed were drawn down on a standard white non-absorbent card to give a wet film of a thickness of 60 microns.

After drying the paints, their colour co-ordinates L, a and b (CIELAB 1976) where measured using a Gardener XL23 Colourmeter. A full description of the CIELAB system is given in Supplement No. 2 to CIE publication No. 15 (E-1.3.1) 1971)/(TC-1.3) 1978.

The L value is an indication of brightness; the 'a' value of the redness of the colour and the 'b' value of the yellowness of the colour. A difference of 0.2 units is significant.

The Table shows that the beads from Example 6 are significantly more yellow than those from Examples 4 and 5.

What is claimed is:

1. A process for the preparation of rigid beads formed from cross-linked polyester resin comprising forming an oil-in-water or a water-in-oil-in-water emulsion in which the oil phase contains an unsaturated polyester resin and an unsaturated organic monomer to provide said cross-linking; heating the emulsion to a temperature of at least 45° C. and thereafter introducing into the heated emulsion a polymerisation initiator, and promoter system if not already present, thereby initiating cross-linking of the resin to form an aqueous suspension of rigid beads of cross-linked polyester resin.

2. A process as claimed in claim 1 wherein the promoter system comprises an organic amine and wherein the total quantity of organic amine in the emulsion is below 1.1% by weight of the total weight of unsaturated polyester and of unsaturated organic monomer.

3. A process as claimed in claim 1 wherein the unsaturated polyester resin is the condensation product of compounds selected from the groups propylene glycol and propylene oxide; fumaric acid, maleic acid and maleic anhydride and phthalic acid and phthalic anhydride.

4. A process as claimed in claim 1 wherein the unsaturated organic monomer is styrene.

5. A process as claimed in claim 1 wherein the emulsion is heated to a temperature of at least 50° C. prior to the addition of the initiator.

6. A process as claimed in claim 1 wherein the dispersed phase of the emulsion prior to the addition of the initiator contains titanium dioxide pigment.

7. A process as claimed in claim 1 wherein the initiator is cumene hydroperoxide.

8. A process as claimed in claim 1 wherein the promoter system comprises diethylene triamine and ferrous ions.

9. A process as claimed in claim 1 wherein the polymerised emulsion forms a suspension of cross-linked polyester resin beads which contains not more than 0.3% by weight of free styrene.

10. A process as claimed in claim 9 wherein the polymerised emulsion forms a suspension of cross-linked polyester resin beads which contains not more than 0.2% by weight of free styrene.

* * * * *